Nov. 1, 1960   M. CURRY   2,958,145
LABELED PLASTIC SPOOL
Filed Oct. 28, 1954   3 Sheets-Sheet 1
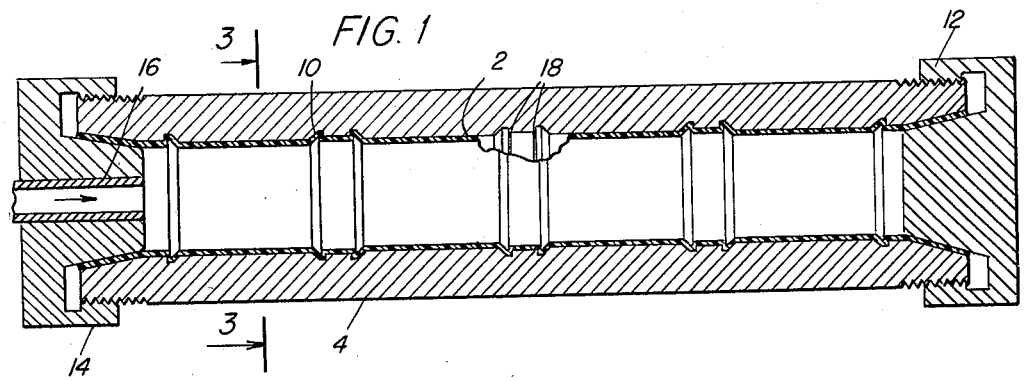
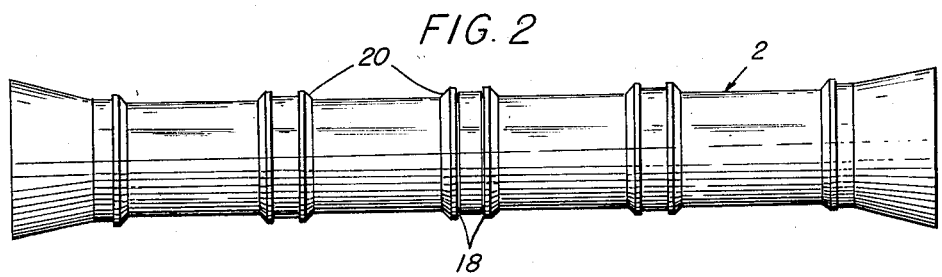
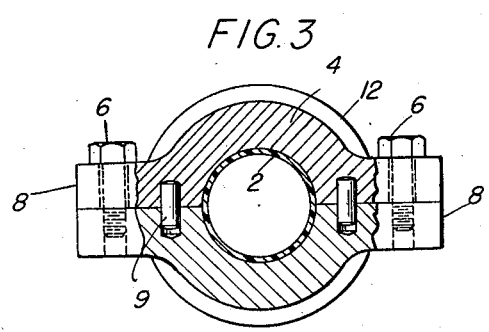
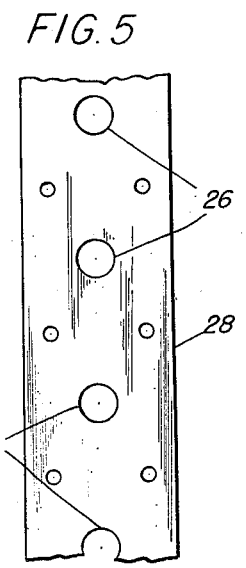
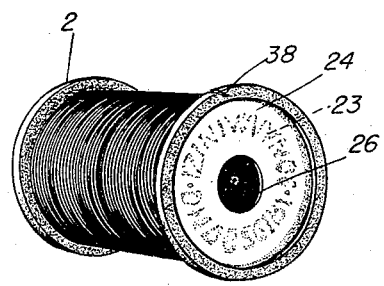
INVENTOR.
Malcolm Curry
BY
Attorneys

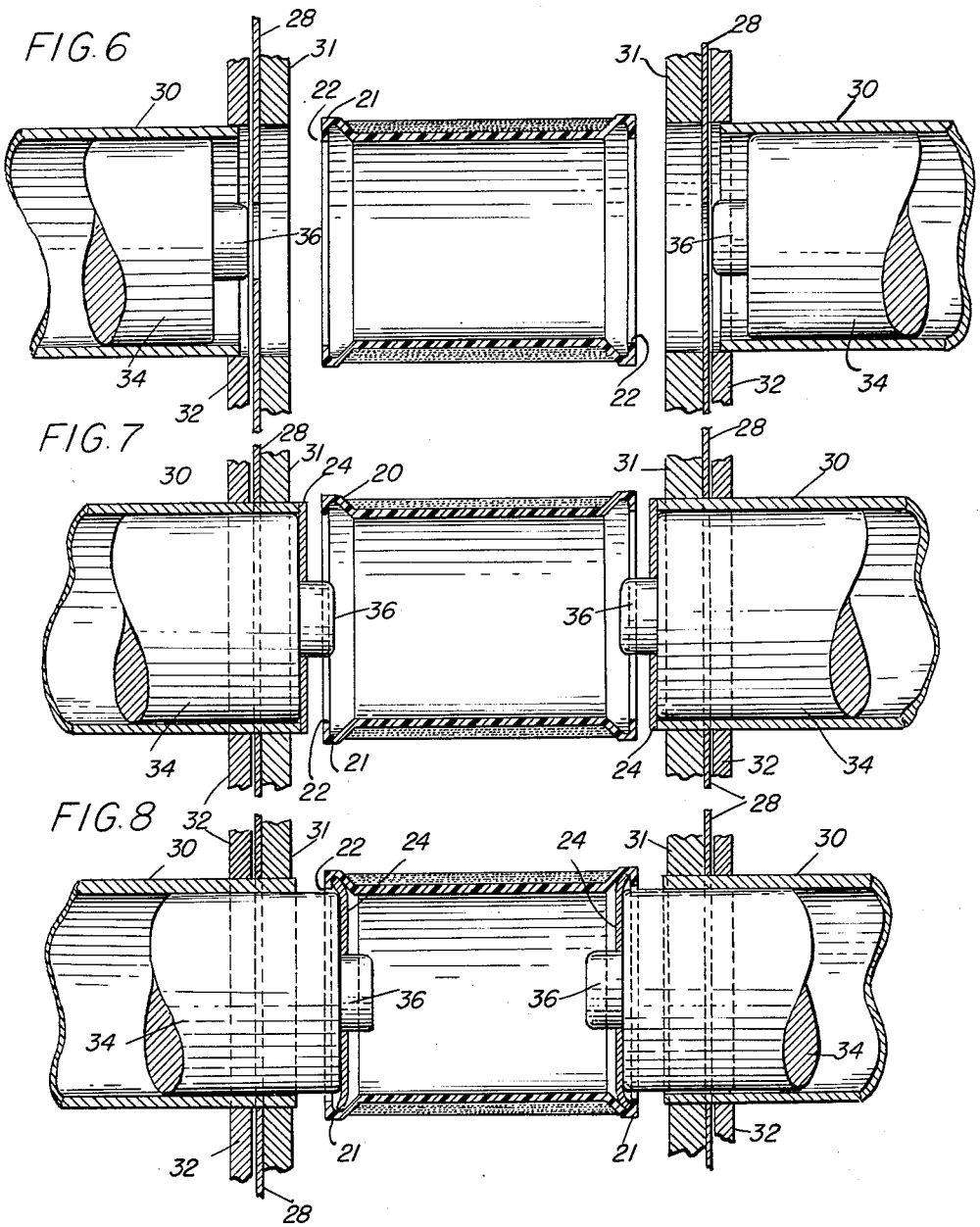

Nov. 1, 1960
M. CURRY
2,958,145
LABELED PLASTIC SPOOL
Filed Oct. 28, 1954
3 Sheets-Sheet 3
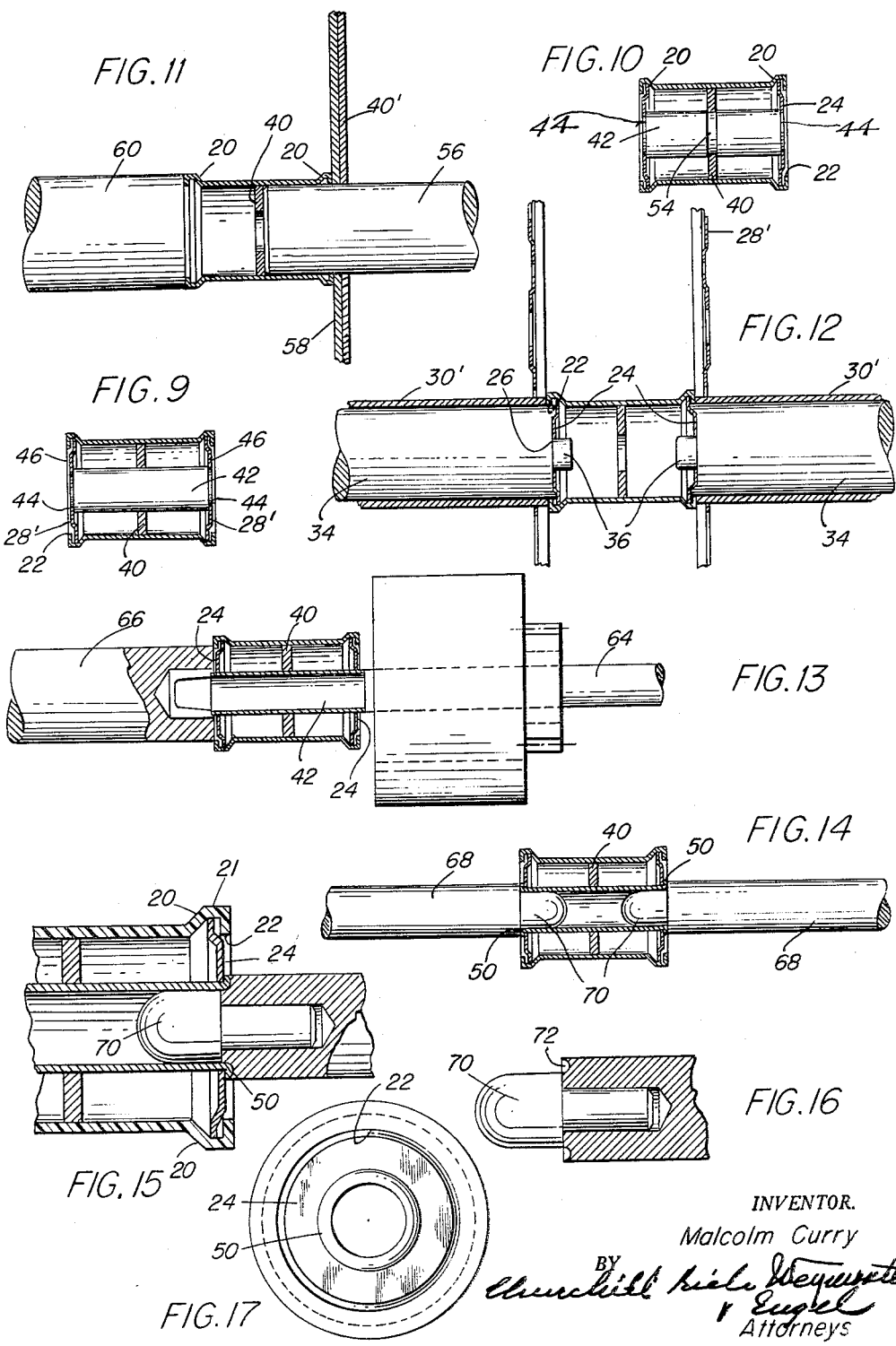
INVENTOR.
Malcolm Curry
BY
Attorneys

United States Patent Office 2,958,145
Patented Nov. 1, 1960

2,958,145

LABELED PLASTIC SPOOL

Malcolm Curry, Flanders, N.J., assignor to The American Thread Company, New York, N.Y., a corporation of New Jersey Filed Oct. 28, 1954, Ser. No. 465,325

8 Claims. (Cl. 40—309)

The present invention relates to spools and method of making, especially spools for sewing thread.

Spools of this type have heretofore generally been made of white birch, and to save in shipping expenses spool turning factories have been commonly located close to the birch wood forests. Such wood spools have certain disadvantages as hereinafter described, and the birch wood forests are rapidly giving out, and other less satisfactory woods such as gum-wood are being resorted to.

One of the objects of the present invention is to provide a spool made essentially of plastic material which has the advantages of the wood spool, while eliminating many of the disadvantages.

Still another of the objects of the invention is to provide a spool for sewing thread of novel and improved construction.

The invention is illustrated, by way of example, in the accompanying drawings, in which:

Figure 1 is a longitudinal sectional view, partly in elevation of an extruded tube of thermoplastic material from which the spools may be formed in accordance with my method, and a spilt matrix or mold, the tube being shown as finally shaped or formed in the mold;

Fig. 2 is a side view of the thus formed tube removed from the mold;

Fig. 3 is a transverse section, partly in elevation, taken on the line 3—3 of Fig. 1;

Fig. 4 is a view in perspective of a completed spool with thread wound thereon;

Fig. 5 is a side view of a portion of a strip from which labels may be formed and applied to the ends of the spools in accordance with my method;

Fig. 6 is a longitudinal sectional view, partly in elevation, of a spool severed from the molded tube as shown in Fig. 2, and devices that may be employed in applying labels to the ends of the spool;

Figs. 7 and 8 are similar views illustrating subsequent steps in the method of applying the labels to the spool;

Fig. 9 is a longitudinal sectional view, partly in elevation, of a modified form of spool;

Fig. 10 is a similar view of another modified form;

Fig. 11 is a sectional view, partly in elevation, of a spool barrel and devices for inserting a supporting disk in the barrel as illustrated in Figs. 9 and 10;

Fig. 12 is a longitudinal sectional view, partly in elevation, of the portion of the spool illustrated in Fig. 11 with disks or labels applied to the ends thereof, and devices for applying the disks or labels to the ends of the spool;

Fig. 13 is a longitudinal sectional view, partly in elevation, of the parts of the spool illustrated in Fig. 12, with a central core or tube inserted therein, and devices for applying the tube;

Fig. 14 is a similar view of the parts of the spool illustrated in Fig. 13 with the ends of the tube riveted over, and devices for thus riveting the ends of the tube;

Fig. 15 is a similar view, on an enlarged scale, of one end portion of the spool and the associated riveting device;

Fig. 16 is a longitudinal sectional elevation of the riveting device shown in Fig. 15; and Fig. 17 is an end elevation of the spool of Figs. 14 and 15.

The tube 2 from which my improved spools may be formed, may be made of thermo-plastic material the tube preferably having been extruded by any of the well known commercial methods. A plastic which I have found especially suitable for this purpose is one put out by Naugatuck Chemical Division of the United States Rubber Company under the designation "Kralastic" types B or F, preferably the former. This plastic is an acrylonitrile styrene resin modified with butadiene acrylonitrile rubber. The plastic when molded and set is light in weight, strong and slightly elastic. It will be understood that other thermo-plastics may be employed, preferably those having similar characteristics to those of "Kralastic." Another plastic which I have found highly satisfactory for forming the spools is one put out by The Dow Chemical Company under the designation Styron 475. This resin is a high impact polystyrene formulation developed by the manufacturer.

The outside diameter of the tube 2 previously to being molded is substantially the same as the diameter of the barrel portion of the spools to be produced. In the case of the spools to be formed with a barrel portion of substantially seven-eighths of an inch in diameter, the wall of the tube may be substantially one thirty-second of an inch in thickness. The tube 2 may be of any desired length depending upon the number of spools to be made therefrom.

In making the spools, the plastic tube may be placed in a mold 4 which is divided longitudinally into two halves that may be held together by any suitable means such as clamping bolts or screws 6 which extend through apertures in lugs or ears 8 on one of the halves, and screw-threaded into apertures in lugs or ears on the other half. Dowel pins 9 may be provided for alining the halves.

The interior of the main body of the mold is of substantially the same diameter as the plastic tube, and is provided with annular recesses 10 that are arranged in pairs corresponding in size, shape and spacing to the rims or flanges of the spools to be formed, the pairs of recesses being spaced apart and spaced from the ends of the mold as approximately shown.

When the tube is positioned in the mold, one end of the tube is closed by a tapered plug 12, and its other end is closed by a tapered plug 14, or made air tight by other means. A pipe 16 has one end secured through an aperture in the plug 14, the pipe leading from a compressed air supply (not shown). The outer ends of the mold are flared slightly to correspond to the taper plugs, so that the ends of the tube are correspondingly flared either before or after the tube is placed in the mold. Thus the tube is firmly and hermetically held in position in the mold.

When the tube has thus been placed in the mold, the mold is heated, electrically or otherwise, so as to soften the tube sufficiently to enable the material of the tube to be forced into the recesses 10 by admitting air or other fluid under pressure through the pipe 16. This has been found to be a convenient means for molding the tube, but it is apparent that other means may be employed for this purpose. The molding may also be effected by the usual vacuum process in which case atmospheric pressure is resorted to to force the plastic to fill the mold.

When the tube is thus molded by either of these methods and cooled sufficiently to set the plastic, the mold is opened and the tube removed.

Thus, the tube is formed with a plurality of pairs of hollow flanges with the flanges of each pair corresponding in form, size and spacing to the flanges of the spools to be formed.

The tube may then be severed in the plane of the outer sides of the flanges of each pair. Such severing of the tube may be accomplished by means of a suitable gang type cutting-off knife or by other means, or V-shaped grooves 18 may be molded in the tube adjacent the outer sides of the pairs of flanges, of sufficient depth as to enable the tube to be easily separated by breaking the spools apart adjacent the outer faces of the flanges thereof.

The flanges of the spools thus formed are provided with beveled portions 20 and cylindrical rim portions 21 corresponding to the portions of the flanges of the conventional wood spool. Vertical reentrant or lip portions 22 are provided having their inner diameters the same as the inner diameter of the tube 2 or slightly greater as shown in the drawings. The stretching of the portions of the material of the tube that are forced into the recesses 10 somewhat reduces the thickness thereof.

In the case of wood spools, the thread is usually wound on each spool separately. By molding a multiplicty of spools on a single tube with the spools spaced apart in accordance with my method, the several spools may be wound simultaneously before severing them from the tube, thus resulting in considerable saving. If desired, however, the spools may be wound individually after separating them from the tube, in the way wood spools are commonly wound.

When the spools have thus been formed on the tube and the spools are wound, either in multiple before or singly after separating them, circular disks or labels 24 having central apertures 26 may be applied to the ends of each spool. These disks or labels 24 may be made of any suitable material, such as tag stock or other stiff paper or cardboard, or plastic. The disks are of slightly greater diameter than the inner diameter of the reentrant portions or lips 22 at the ends of each spool. This enables the peripheries of the disks to be snapped under the resilient edges of the lips 22 and against shoulders provided by the inner beveled portions 20 of the spool flanges (Fig. 8).

It will be noted that due to the pressure applied in snapping the disks in place, the outer edges of the disks are sprung slightly in passing through the resilient reentrant lips 22, and when in position against the beveled shoulders 20 they are beveled or bent outwardly. This results in the disks being firmly held by resilient pressure against outward displacement when the spools are placed upon the spindles of the sewing machines.

The disks may bear printing matter 23 including the trademark, thread length, thread size, and other data commonly used on the tickets or labels of wood spools. Thus these disks, in addition to supporting the spools on the sewing machine spindles, make it unnecessary to adhesively attach printed tickets or labels to the ends of the spools as customarily done in the case of wood spools.

The disks 24 for each spool may be cut or punched simultaneously from strips 28 by means of punches 30 and dies 31.

The strips 28 are fed intermittently so as to successively position the apertures 26 therein in alinement with the punches 30 and the axes of the spools which are successively brought into alinement with the punches 30. The strips pass between the dies 31 and guide members 32, and suitable means (not shown) may be provided for thus intermittently feeding the strips, operating the punches, and successively positioning the spools in alinement with the punches.

When each spool is positioned in alinement with the punches 30, the punches are advanced to sever the disks 24 from the strips. Simultaneously with such movement of the punches 30, plungers 34 extending through the punches 30 are advanced to first cause centering pilots or pins 36 on their ends to enter the pre-punched apertures 26 in the strips and then to cause the ends of the plungers to engage the outer sides of the disks. Such advancing movements of the punches 30 are then arrested, and the plungers 34 advance beyond the ends of the punches and force the disks beneath the resilient lips 22 and into engagement with the beveled shoulders 20 as above described, the centering pins 36 centering the disks during this movement of the plungers. This completes the applying of the disks to the ends of the spool.

Upon retraction of the plungers and punches, the spool may be removed from between them, and the operation repeated to again punch disks from the intermittently fed strips 28 and apply them to the ends of the next spool which is brought into position between the pairs of punches and plungers.

At the completion of the winding of each spool, the final end of the thread may be secured in any suitable manner such as by drawing it into a nick or notch 38 cut in one of the flanges of the spool, in the same manner as is employed in the case of wood spools.

If, owing to the smoothness of the barrel portions of the plastic spools, difficulty is experienced in starting the wind, any suitable means may be provided to overcome this as by roughening the mold surface in the area of the core or barrel of the spool, or the inner end of the thread may be held by inserting it through the barrel of the spool by means of a suitable instrument such as a fishtail needle.

It will be noted that my improved spool corresponds in size and appearance to the usual wood spool for sewing thread and may be used in the same manner. When used on a sewing machine, the apertures 26 in the disks or labels 24 permit the spool to be placed on the spindle of the machine, the disks being of sufficient stiffness to properly aline the spool during the operation of the machine.

Wood spools are not stable under varying weather conditions, tending to shrink across the grain when dry and thus taking more or less an oval form. The conventional paper tickets or labels adhesively applied, frequently loosen or drop off due to the variations in shrinkage of wood and paper. Also, in excessively dry weather, wood spools tend to shrink so that the thread mass sometimes becomes loose and revolves freely on the spool. With my improved spool, no adhesive is required for attaching the disks or labels 24, and the slightly resilient plastic tends to produce a yielding outward pressure on the wound thread mass preventing it from loosening on the spool. With the disks or labels recessed within the ends of the spool, they are prevented from rubbing on flat surfaces such as counters.

The scrap resulting from the severing of the spools from the tube 2 can be reground and re-used, so that no waste of material results.

The spools may be made at the thread-winding mills where they can be produced as wanted without anticipating the requirements, as is the case with wood spools which depend upon seasonal lumbering and other operations.

Owing to the lightness of the spools as compared with the conventional wood spools there is a substantial reduction in transportation charges, and the lightness thereof also makes for greater ease in bulk handling both the wound and unwound spools.

The parts of the modified spools illustrated in Figs. 9, 10 and 14 that correspond with the parts of the spool illustrated in Figs. 4, and 6 to 8, have been given like reference characters.

The spool illustrated in Fig. 9 is provided with a central partition or disk 40, and a tubular core or tube 42 that has its ends reduced in diameter to provide shoulders 44 that abut the inner sides of the disks. Also, as shown instead of the end disks 28' being flat, they may be centrally dished outwardly so as to provide outer convex portions 46.

The central tube 42 provides a guide for the spool in placing it on the spindle of a sewing machine. The tube 42 also cooperates with the hollow flanges on the ends of the spool to hold the disks in place. The shoulders 44 by abutting the inner sides of the disks, help to support them. The tube may be made of paper or other suitable material.

The ends of the tube may be riveted over as shown at 50 in Figs. 14, 15 and 17. In the latter views the tube is shown without shoulders 44. Even without such shoulders, with a close fit of tube in the disks, the riveting of the ends of the tube in the manner hereinafter described, serves to effectively secure the central portions of the disks to the tube, the riveting operation tending to cause the walls of the openings in the disks to embed themselves in the material of the tube.

The convex central portions of the disks, in addition to providing stability, permit the printed matter on the disks to be positioned close to the plane of the outer sides of the lips 22, which adds to the attractiveness of the spool and gives it a more solid appearance similar to that of the usual wood spool.

In Fig. 9 the annular disk or partition 40 is shown centrally positioned in the barrel of the spool. This partition is firmly pressed into the barrel, and the tube 42 tightly fits the aperture therein, and thus effectively reinforces the barrel of the spool, and with the tube serves to give the spool greater rigidity. This permits the barrel of the spool to be made of minimum thickness of material. The partition may be made of cardboard or other suitable material.

In certain instances it may be desirable to provide the core tube with a central annular depression 54 for receiving the wall of the aperture in the partition 40 so as to firmly secure these parts together (Fig. 10). With the partition 40 made of cardboard and the depression sufficiently shallow, I have found that during the insertion of the tube through the partition, the material of the partition will give sufficiently to permit the greater diameter of the tube to pass therethrough, and thus cause the wall of the aperture in the partition to become firmly seated in said depression. Also, where the tube has shouldered ends (Figs. 9 and 10) and the tube is inserted after the disks are applied, the tube may be similarly inserted through either disk as well as through the partition.

In Fig. 11, a disk or partition 40 is shown severed from a strip 40' by means of a punch 56 as the strip is fed over a guide 58, any suitable means such as a turret (not shown), being employed to successively present spools between the punch and a restraining plunger 60.

Fig. 12 illustrates means for applying the end disks 24 to the ends of the spool. These disks are cut from previously shaped strips 28' by means of punches 30', and the disks are forced beneath the lips 22 in the same manner as in the case of the spool first described. If desired, however, flat disks may be similarly employed.

After the disks are thus applied, the core or tube 42 is inserted. In Fig. 13, a plunger 64 is shown inserting a tube, when a spool has been positioned between the plunger and a restraining member 66, the tubes being fed to the plunger 64 by any suitable means such as a feed barrel.

With the core applied, the spool is positioned between two plungers 68 (Fig. 14). The plungers are provided with pilots or pins 70 for centering the spool, and riveting heads 72 which engage the projecting ends of the tube and rivet them over as clearly shown in Figs. 14 and 15.

It will be understood that any suitable means such as a wheel or turret may be provided for successively presenting spools to the several devices above described.

While my method is illustrated and described in connection with the manufacture of spools having flanges or heads at both ends, it will be apparent that it may be employed in the manufacture of single head spools by the use of properly shaped molds.

This application is a continuation in part of my pending application Serial No. 381,869, filed September 23, 1953, and now abandoned.

What I claim is:

1. A thread spool made of slightly resilient plastic and provided with labeled ends attached thereto without the use of adhesive comprising an open ended tubular barrel having hollow flanges projecting from the ends thereof, each of said flanges having an outwardly beveled portion, a reentrant portion forming the end of the spool and a peripheral portion connecting said beveled portion and said reentrant portion to provide snap-in enclosures, said reentrant portions being resilient, and annular disk shaped labels of resilient material having the edges thereof arranged within the edges of said reentrant portions and marginally abutting the inner surfaces of said beveled portions, the peripheries of said labels being snapped under said reentrant portions within said snap-in enclosures and being retained between said reentrant and beveled portions of said flanges whereby the ends of said barrel are enclosed and the labels are retained in place on the ends of the spool.

2. A spool made of plastic material of the kind described, the plastic material being slightly resilient, comprising a tubular barrel portion and hollow flanges at the ends of said barrel portion, each of said flanges having an outwardly beveled portion, a reentrant portion forming the end of the spool, and a peripheral portion connecting said beveled portion and said reentrant portion, disks having the edges thereof arranged within the edges of said reentrant portions so as to hold the disks in place, said reentrant portions being resilient, and said disks being made of resilient material, whereby when the disks are forced into said position within the edges of said reentrant portions the outer edges of the disks assume an outwardly flared position under tension.

3. A thread spool made of slightly resilient plastic and provided with labeled ends attached thereto without the use of adhesive comprising an open ended tubular barrel having hollow flanges projecting from the ends thereof, a central tubular core coaxially disposed within said barrel, each of said flanges having an outwardly beveled portion, a reentrant portion forming the end of the spool and a peripheral portion connecting said beveled portion and said reentrant portion to provide snap-in enclosures, said reentrant portions being resilient, and annular disk shaped labels of resilient material having the edges thereof arranged within the edges of said reentrant portions and marginally abutting the inner surfaces of said beveled portions, the peripheries of said labels being snapped under said reentrant portions within said snap-in enclosures and being retained between said reentrant and beveled portions of said flanges whereby the ends of said barrel are enclosed and the labels are retained in place on the ends of the spool, said labels being provided with central apertures with the ends of said core extending through said apertures.

4. A plastic thread spool in accordance with claim 3 wherein the ends of the core are riveted over against the outer sides of the labels.

5. A plastic thread spool in accordance with claim 3 in which a transverse partition is secured in said tubular barel portion between the ends thereof.

6. A plastic thread spool in accordance with claim 5 in which said partition and said labels have apertures in axial alinement, and said tubular core extends through the apertures in said partition, and has its ends secured in the apertures in said labels.

7. A plastic thread spool in accordance with claim 6 in which said core has an annular depression for receiving the wall of the aperture in said partion.

8. A plastic thread spool in accordance with claim 3 in which the labels are provided with central apertures, and said core is provided with its ends reduced in diameter and projecting into said apertures.

References Cited in the file of this patent

UNITED STATES PATENTS

| | | |
|---|---|---|
| 414,205 | Frauenberger | Nov. 5, 1889 |
| 427,329 | Kelsea | May 6, 1890 |
| 1,140,868 | Bennett | May 25, 1915 |
| 1,350,979 | Schloerb | Aug. 24, 1920 |
| 1,426,760 | Nichol | Aug. 22, 1922 |
| 1,484,234 | Prentiss | Feb. 19, 1924 |
| 1,528,445 | Marshall | May 3, 1925 |
| 1,865,423 | Atwood | July 5, 1932 |
| 1,958,840 | Baker | May 15, 1934 |
| 2,183,437 | Walter | Dec. 12, 1939 |
| 2,285,732 | Markle | June 9, 1942 |
| 2,353,054 | Liss | July 4, 1944 |
| 2,597,558 | Bailey | May 20, 1952 |
| 2,624,916 | Persak | Jan. 13, 1953 |
| 2,648,507 | Kitzrow | Aug. 11, 1953 |
| 2,659,547 | Broadbent et al. | Nov. 17, 1953 |

FOREIGN PATENTS

| | | |
|---|---|---|
| 3,857 | Great Britain | 1878 |
| 7,187 | Great Britain | 1836 |
| 275,387 | Switzerland | Aug. 1, 1951 |
| 434,062 | Great Britain | Aug. 26, 1935 |